May 17, 1966    H. REIFENHAUSER ETAL    3,251,523
APPARATUS FOR PULLING A STRAND-LIKE MEMBER IN
A LONGITUDINAL DIRECTION

Filed March 26, 1963      3 Sheets-Sheet 1

INVENTORS
HANS REIFENHAUSER
PETER HAAS
BY
ATTORNEYS

May 17, 1966  H. REIFENHAUSER ETAL  3,251,523
APPARATUS FOR PULLING A STRAND-LIKE MEMBER IN
A LONGITUDINAL DIRECTION
Filed March 26, 1963  3 Sheets-Sheet 2
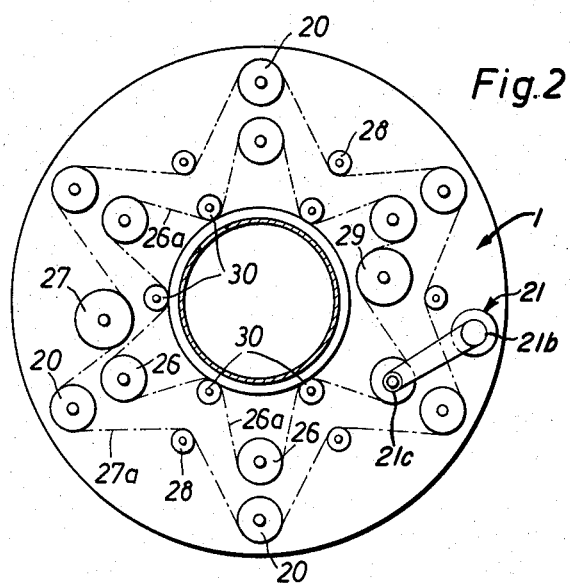
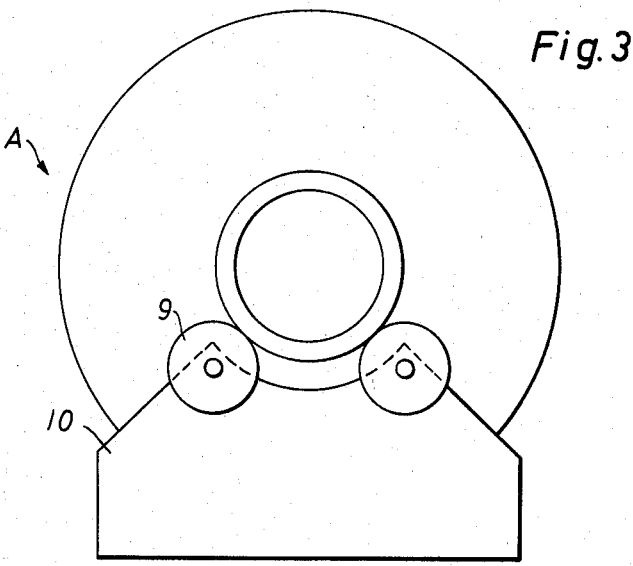
INVENTORS
HANS REIFENHAUSER
PETER HAAS
BY
ATTORNEYS

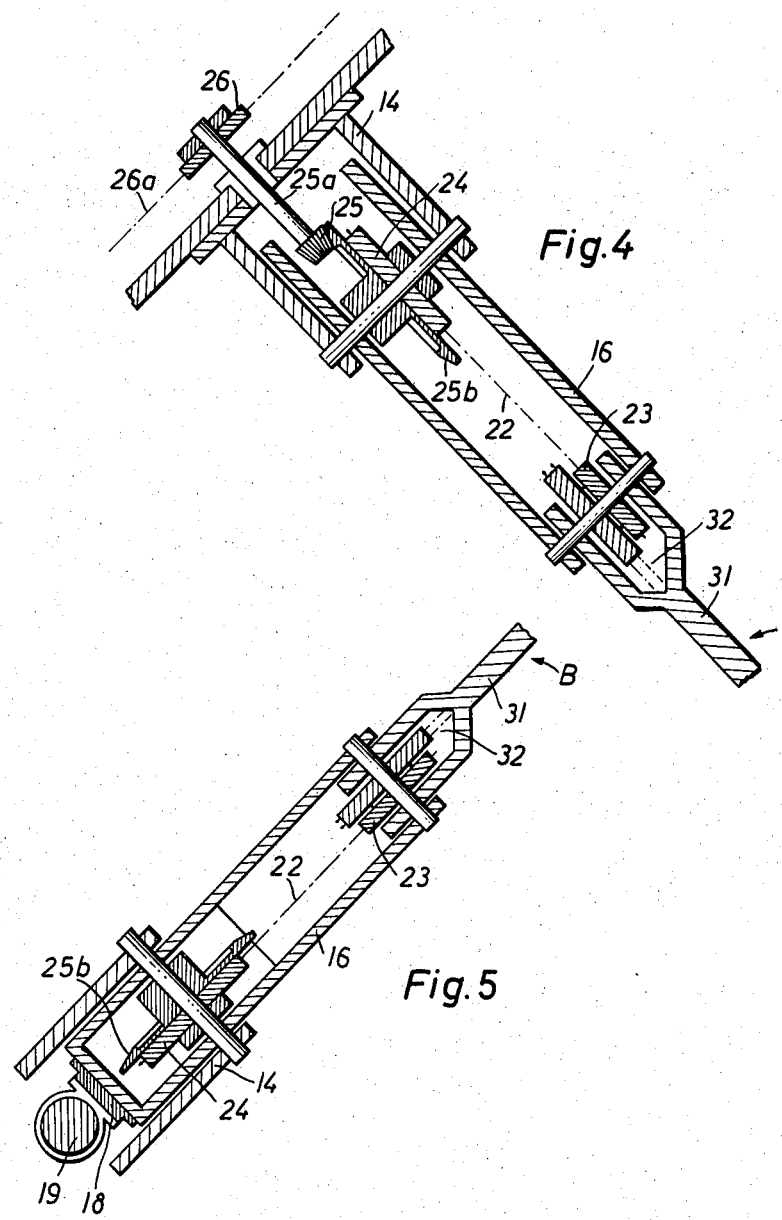

United States Patent Office 3,251,523
Patented May 17, 1966

3,251,523
APPARATUS FOR PULLING A STRAND-LIKE MEMBER IN A LONGITUDINAL DIRECTION
Hans Reifenhauser and Peter Haas, Troisdorf, Germany, assignors to Reifenhauser K.G., Troisdorf, Germany
Filed Mar. 26, 1963, Ser. No. 268,531
Claims priority, application Germany, Mar. 30, 1962, R 32,393
4 Claims. (Cl. 226—172)

The present invention pertains to the art of pulling devices and more particularly to an apparatus for pulling a strand-like member in a longitudinal direction.

The present invention is particularly applicable for use in pulling a tubular plastic member in a longitudinal direction and the invention will be discussed with particular reference thereto; however, it must be appreciated that the invention has much broader applications and it may be used for pulling various strand-like members in a longitudinal direction.

The term "strand-like" is generic in nature and refers to a multitude of different kinds of elongated members such as, without limitation, plastic tubing, cables, braided tubing, cords, and wires.

In manufacturing a strand-like member, it is necessary to pull the member longitudinally through the processing apparatus; however, often it is difficult to apply a longitudinal force to the member without marring the surface or causing radial distortion of the member. To overcome this difficulty, it has become common practice, to provide a plurality of member engaging friction drive elements spaced around the periphery of the member so that the drive elements, which may take the form of endless belts, can be driven while engaging the surface of the member to pull the member longitudinally. Such an arrangement has proven satisfactory in many instances when the member travels in only a longitudinal direction. When the member is to be rotated while moving in a longitudinal direction, such as when the member must be rotated to wind components thereon, such previously known apparatus for pulling the member are completely inapplicable.

To solve this problem, drive rolls have been provided which rotate on an axis obliquely positioned with respect to the axis of the moving member. The size of the angle between the axes of the drive rolls and the axis of the longitudinally moving member determines the component of force which is exerted longitudinally of the member. In order to position the drive rolls at an optimum angle determined by the rate of longitudinal movement and the angular velocity of the moving member, little of the force exerted by the drive roll was directed longitudinally of the moving member; therefore, it became necessary to provide several sets of drive rolls positioned in tandem. These drive rolls seriously distorted the moving member, especially when the member was tubular, and often caused surface irregularities that prevented use of the member in its intended environment.

These and other disadvantages have been eliminated by the present invention which is directed toward an apparatus for pulling a strand-like member in a longitudinal direction, especially such an apparatus for a member which must be rotated as it is moving longitudinally.

In accordance with the present invention, there is provided an improvement in an apparatus for pulling a strand-like member in a longitudinal direction which apparatus comprises a plurality of member engaging friction drive elements spaced around the periphery of the member, first means for driving the drive elements in a direction substantially parallel to the axis of the member, and second means for forcing the drive elements against the periphery of the member. The improvement in such an apparatus comprises essentially a frame for supporting both the drive elements and the first means and means for rotating the frame about the axis of the member while the elements pull the member through the frame.

The primary object of the present invention is the provision of an apparatus for pulling a strand-like member in a longitudinal direction which apparatus does not mar or otherwise damage the member, is economical to product, and durable in operation.

Another object of the present invention is the provision of an apparatus for pulling a strand-like member in a longitudinal direction which apparatus can pull the member while the member is rotating without causing damage to the member.

Another object of the present invention is the provision of an apparatus as defined above which does not require as great a radial force against the member as heretofore necessary.

Still a further object of the present invention is the provision of an apparatus for pulling a strand-like member in a longitudinal direction which apparatus comprises drive members mounted on a frame and means for rotating the frame about the axis of the member while the elements pull the member through the frame.

These and other objects and advantages will become apparent from the following description used to illustrate the preferred embodiment of the invention as read in connection with the accompanying drawings in which:

FIGURE 2 is a somewhat schematic, cross-sectional end view taken generally along line 2—2 of FIGURE 1;

FIGURE 3 is a somewhat schematic, end view taken generally along line 3—3 of FIGURE 1;

FIGURE 4 is a cross-sectional view taken generally along line 4—4 of FIGURE 1; and FIGURE 5 is a cross-sectional view taken generally along line 5—5 of FIGURE 1.

Figure 1:
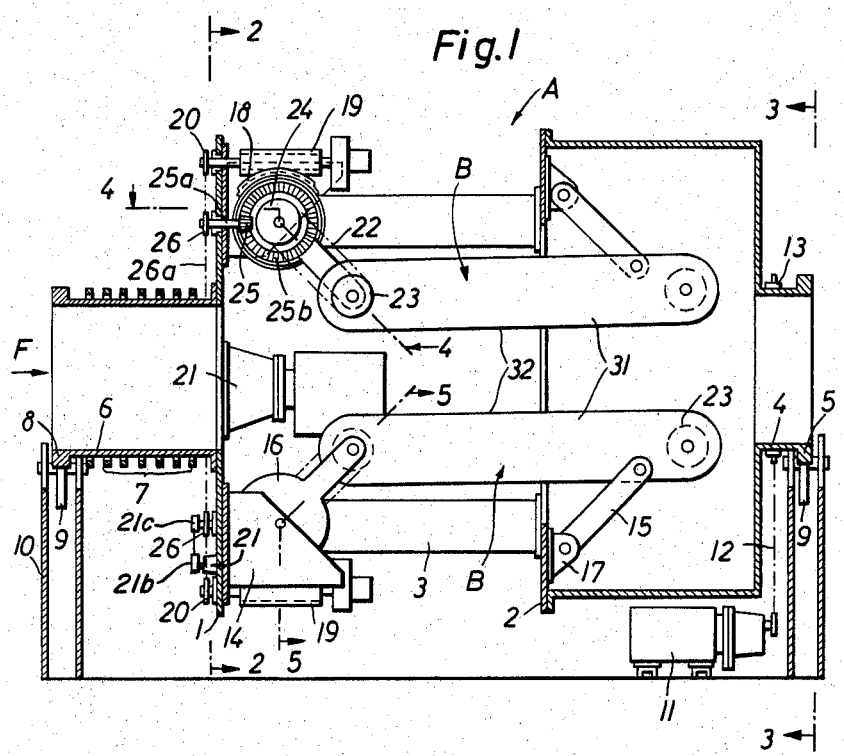
FIGURE 1 is a side elevational, somewhat schematic cross-sectioned view illustrating the preferred embodiment of the present invention.

Referring now to the drawings, wherein the showings are for the purpose of illustrating a preferred embodiment of the invention only and not for the purpose of limiting same, FIGURE 1 shows an apparatus A for pulling a strand-like member in a longitudinal path indicated by arrow F. The member is omitted to allow better observation of the apparatus; however, it is to be appreciated that the member may be a plastic tubing which is rotating about its axis for various reasons dictated by the processing operation preceding or following apparatus A. Consequently, the member passing through apparatus A is moving longitudinally and simultaneously rotating which, in the past, has posed substantial problems in the development of an apparatus for exerting a longitudinal force on such a member.

Referring now to the drawings, apparatus A comprises spaced disks 1, 2 supported on either end of longitudinally extending braces 3. Adjacent one end of the apparatus A, there is provided a cylindrical casing 4 having a terminal bearing ring 5. At the other end of apparatus A there is provided another cylindrical casing 6 quite similar to the cylindrical casing 4 and having a terminal bearing surface 8. For purposes to be hereinafter appreciated, the casing 6 is provided with spaced slip rings 7 to direct current from brushes (not shown) to elements on the disk 1.

To rotatably support the unit formed from spaced disks 1, 2, there is provided, in accordance with the preferred embodiment of the present invention, support rolls 9 journaled within frame 10 and adapted to engage bearing rings 5, 8 at the either end of apparatus A. (See FIGURE 3.) A variety of structural embodiments could be incorporated for rotating the disks 1, 2. However, in accordance with the illustrated embodiment of the present invention, there is provided a motor 11 secured to frame 10 and adapted to drive chain 12 which is connected onto the disk unit by sprocket 13. Through appropriate control arrangement, the speed of the motor 11 may be conveniently varied to change the speed at which the disk unit is rotated.

On the surface of disk 1 facing toward disk 2, there are provided a plurality of drive means supporting brackets 14 the number of which may vary; however, in accordance with the illustrated embodiment of the present invention, there are provided six of these brackets 14 evenly distributed in a circular disposition on disk 1. These brackets support mechanisms which are adapted to hold a plurality of friction drive means B into engagement with the surface of the member moving between these means B. To support the drive means, there are provided swinging links 15, 16 the latter of which is provided with various control elements to drive the drive means B and to force the means B radially inwardly against the member moving through apparatus A. The bracket 14 supports link 16 and a bracket 17 supports link 15 so that these links can move in unison to create a toggle or parallelogram action for forcing the means B against the outer periphery of the member.

To explain in more detail the mechanism for forcing the drive means inwardly against the member being pulled, the link 16 is provided with a spur gear sector 18 coacting with a self-locking worm 19 journaled in disk 1 and having a sprocket 20 for driving the same. (See FIGURE 5.) A control motor 21 drives sprocket 27 to impart movement to chain 27a which chain is entrained around idler sprockets 28 and driven sprockets 20 whereby rotation of sprocket 27 by motor 21 in either direction will cause the various links 16 to be rotated by worm 19. (See FIGURE 2.) Since the worm 19 is self-locking, no movement is transmitted to chain 27a by force exerted on the gear sector 18. Rotation of sprocket 20 moves the individual drive means B into engagement with the member moving through apparatus A and a slip-clutch is provided at each of the sprockets 20 so that a predetermined limit can be set for the force exerted inwardly by the drive means B. Motor 21 is connected, by appropriate means (not shown), onto certain of the slip rings 7 so that an electrical signal impressed on certain of the brushes in contact with the slip rings can control the direction and amount of rotation of motor 21 to control the inward movement of means B. Of course, the motor 21 is adapted to be mounted on disk 1 so that the motor moves with the disk.

The individual drive means B comprises an elongated frame 31 surrounded by a continuous conveyor such as a belt 32. To drive the belts 32, there are provided within link 16 an appropriate drive which, in accordance with the preferred embodiment of the present invention, comprise a chain 22 drivingly connecting sprocket 24 with sprocket 23. Each sprocket 24 is driven by a pinion 25 having a shaft 25a journaled within disk 1 and driven by sprocket 26. The pinion 25 coacts with a bevel gear 25b to drive sprocket 23, and thus the belt 32, as sprocket 26 is rotated. (See FIGURE 4.) Driving force is exerted on the various sprockets 26 spaced around the face of disk 1 by a chain 26a connected to a driven sprocket 29 and entrained around idler sprockets 30. (See FIGURE 2.) Sprocket 29 is driven by an appropriate motor (not shown) that receives impulses through brushes riding on appropriate slip rings 7.

In the operation of apparatus A, the member passes through the disks 1, 2 and the drive belts 32 are forced into engagement with the outer periphery of the member. The motor 11 rotates disks 1, 2 in accordance with the angular velocity of the member moving through the apparatus. Motor 11 may be provided with a conventional speed control whereby the speed of the motor may be adjusted in accordance with the angular velocity of the member moving through the apparatus manually or automatically. Motor 21 is actuated to control the inward position of means B and the force exerted by these means onto the outer periphery of the moving member. Another motor 21a has a sprocket 21b which drives sprocket 26 as shown in FIGURE 2 at a given speed to cause the necessary linear speed of the belts 32.

The zigzag arrangement of chains 26a, 27a is utilized to maintain substantially constant tension on the chains to assure uniform action of the separate drive means in response to rotation of driven sprockets 27, 29.

The present invention has been described in connection with a preferred structural embodiment; however, it is appreciated that various structural changes may be made without departing from the intended spirit and scope of the invention as defined by the appended claims.

Having thus described my invention, I claim:

1. In an apparatus for continuously advancing an elongated workpiece of indeterminate length along its axis, said support apparatus comprising at least three radially spaced supporting members, a pair of pivoted parallel links of substantially equal length holding each member parallel to said axis, an endless conveyor rotatably carried on each of said members for engagement longitudinally of said workpiece, first means for driving said conveyors at an adjustable common speed and second means for moving said support members equidistantly radially of said workpiece axis, the improvement comprising: said second means including a gear sector fixedly secured onto one link of each of said supporting members, each of said sectors having a center of curvature generally matching the pivotal axis of said link to which it is attached, a self-locking worm gear for driving each of said sectors and means for driving said worm gears in unison to move said support members in unison toward and away from said workpiece.

2. In an apparatus for pulling a strand-like member in a longitudinal direction, comprising a plurality of member engaging friction drive elements spaced around the periphery of said member, first means for driving said drive elements in a direction substantially parallel to the axis of said member, and second means for forcing said drive elements against the periphery of said member, the improvement comprising: a frame for supporting both said drive elements and said first means, and means for rotating said frame about the axis of said member while said elements pull said member through said frame, said second means comprising a gear sector on said frame, a self-locking worm gear engaging said sector, a control sprocket mounted onto said frame and third means for rotating said control sprocket to move said drive elements radially with respect to said member.

3. The improvement as defined in claim 2 wherein said third means comprises a motor supported on said frame and having a driven sprocket and an endless drive member entrained around said control sprocket and said driven sprocket.

4. In an apparatus for pulling plastic tube in a longitudinal direction, comprising a plurality of member engaging friction drive elements spaced around the periphery of said tube, first means for driving said drive elements in a direction substantially parallel to the axis of said tube, second means for forcing said drive elements against the periphery of said tube, a frame for supporting both said drive elements, said first means and said second means, and means for rotating said frame about the axis of said tube while said elements pull said tube, the improvement comprising: said second means including two swingable links spaced longitudinally along said tube, spaced rotary elements adjacent the terminal ends of said links, said drive elements each comprising a belt entrained around said rotary elements and movable in an axial direction by rotation of said rotary elements, said belt having an outer friction surface engageable with said tube, and said first means including a mechanical connection for rotating at least one of said rotary elements of said drive elements whereby said friction surfaces of said drive elements pull said tube longitudinally while simultaneously rotating therewith.

References Cited by the Examiner

UNITED STATES PATENTS

| | | | |
|---|---|---|---|
| 1,282,788 | 10/1918 | Fenn | 226—172 |
| 2,048,557 | 7/1936 | Mickelson | 214—338 |
| 2,742,144 | 4/1956 | Meyerbach | 226—172 |
| 2,935,178 | 5/1960 | Lutcke | 226—172 |
| 3,022,928 | 2/1962 | Ulmitz | 226—172 |

FOREIGN PATENTS 586,562    11/1959    Canada.

ROBERT B. REEVES, *Primary Examiner.*

RAPHAEL M. LUPO, *Examiner.*

C. AOUSSAT, *Assistant Examiner.*